United States Patent [19]

Clark

[11] 3,979,253

[45] Sept. 7, 1976

[54] METHOD FOR DISPERSING GLASS FIBERS FOR THE PREPARATION OF GLASS FILTER MEDIA

[75] Inventor: Robert C. Clark, Annandale, Va.

[73] Assignee: The United States of America as represented by the Secretary of the Navy, Washington, D.C.

[22] Filed: Feb. 5, 1976

[21] Appl. No.: 655,359

Related U.S. Application Data

[63] Continuation-in-part of Ser. No. 462,841, April 22, 1974, abandoned.

[52] U.S. Cl. ................................. 162/145; 55/527; 55/DIG. 5; 162/156; 162/164 R; 162/181 R; 162/181 C; 162/182; 162/183; 264/23

[51] Int. Cl.² ........................................... D21H 5/18

[58] Field of Search ................ 162/145, 156, 164 R, 162/181 R, 181 C, 182, 183, DIG. 3; 65/65 R; 264/23, 109; 55/524, 527, DIG. 5; 427/57, 221, 387; 106/287 SB

[56] References Cited

UNITED STATES PATENTS

| | | | |
|---|---|---|---|
| 2,797,163 | 6/1957 | Smith et al. | 162/156 X |
| 3,228,825 | 1/1966 | Waggoner | 162/156 X |
| 3,240,663 | 3/1966 | Raczek | 162/164 R X |
| 3,249,491 | 5/1966 | Young et al. | 162/145 X |
| 3,253,978 | 5/1966 | Bodendorf et al. | 162/156 X |
| 3,375,155 | 3/1968 | Adams | 65/65 R |
| 3,882,135 | 5/1968 | Adams | 65/65 R |

*Primary Examiner*—S. Leon Bashore
*Assistant Examiner*—Arthur L. Corbin
*Attorney, Agent, or Firm*—R. S. Sciascia; Philip Schneider; Melvin L. Crane

[57] ABSTRACT

Beta Glass fibers are dispersed in a solution containing hydrochloric acid and a hydrophobic fumed silicon dioxide treated with a silane thereby forming a slurry which is subjected to a sonic probe whereafter other glass fibers are mixed into said slurry and the mixture is formed into a glass fiber filter.

7 Claims, 1 Drawing Figure

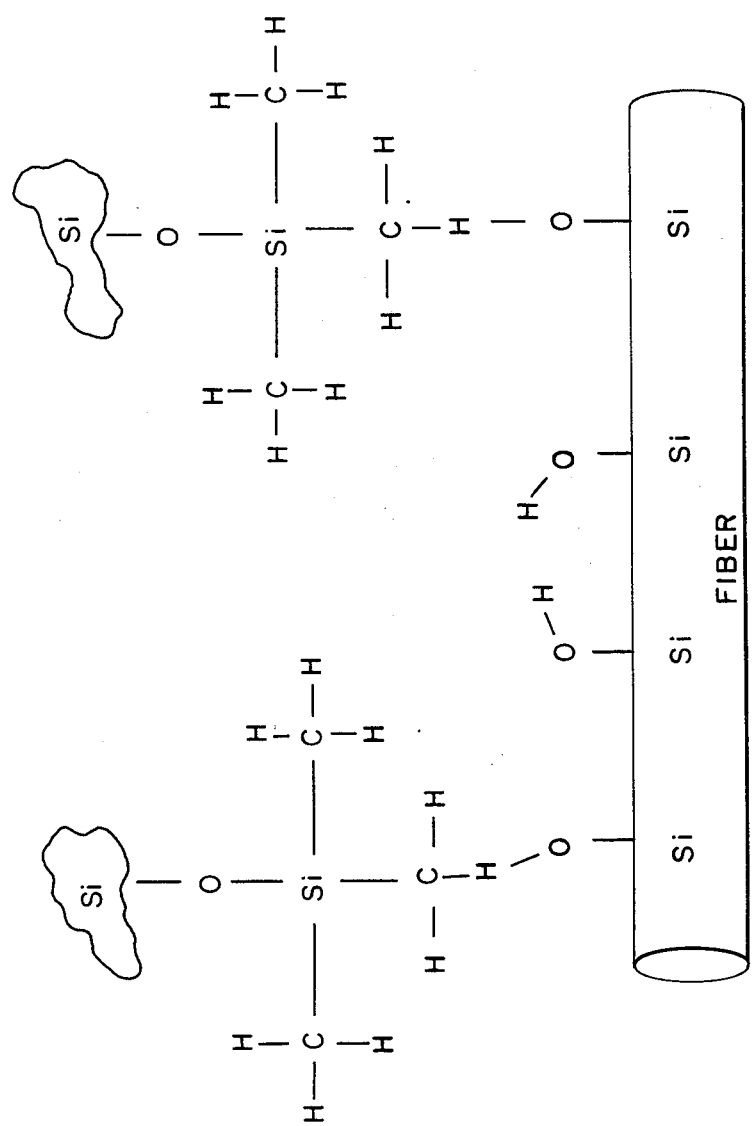

METHOD FOR DISPERSING GLASS FIBERS FOR THE PREPARATION OF GLASS FILTER MEDIA

This application is a continuation-in-part of application Ser. No. 462,841 filed Apr. 22, 1974, now abandoned.

BACKGROUND OF THE INVENTION

This invention relates to methods of forming aerosol filters and more particularly to aerosol filters which are formed with a uniform mat of a Beta fiber reinforced glass paper filter media.

Heretofore highly efficient filters have been made which are capable of retaining over 99% of particulate matter having a diameter of less than 0.3 micron with a small pressure drop in gas flow rates. However an all glass filter paper typically contains a variety of sizes of micro fibers. The relative amounts of these different sizes determines the aerosol filtration and air resistance properties. There are also quantities of coarser fibers made from chopped yarn which add mechanical strength to the sheet. An example of this chopped yarn is A-10 glass, rather coarse and stiff, they are ¼ and ½ inch long and about 15 microns in diameter. Use of these large diameter stiff fibers tend to puncture the media when folding to accommodate the formation of pleated filters, and poor dispersion severely affects the mechanical strength during these forming operations.

SUMMARY OF THE INVENTION

A small diameter long, length glass reinforcing fiber (Beta fiber, made by Owens Corning) is used in a standard type glass micro fiber formulation to construct high efficiency particulate aerosol filters. Using such glass fibers, requires a unique method which functions to prevent the basic glass fibers from roping or tangling into a mat. Thus, high efficient uniform mats may be formed which may be folded without damage to the fibers.

BRIEF DESCRIPTION OF THE DRAWING

The drawing illustrates the theory of what happens chemically to hold the fibers apart.

DESCRIPTION OF THE INVENTION

Glass filter media is made by a formulation consisting of different size and types of glass fibers and yarns. The following method is used to obtain good dispersion of Beta Fibers in the construction of high efficiency particulate aerosol filters. The method comprises removing the starch type sizing or surface coating from the Beta Glass Fibers made by Owens Corning. The Beta Glass Fibers 0.05 grams each, of ¼ inch and ½ inch having a diameter of from 3–4 microns are placed into a high temperature oven having a temperature of from about 325°c to about 375°C for high temperature exposure for a period of about 16 hours. The applied temperature causes the degradation of the existing coating of a starch type sizing, thereby exposing a restored surface of glass. This restored surface will be highly susceptible to the solution of acid (HCL) and Silanox which is the next step in the process. These heat cleaned Beta Glass Fibers are then added to 2½ liters of a 2.5 to 3.0 pH hydrochloric acid solution in a beaker to which has been added 0.02 grams of Silanox, a trade mark of the Cabot Corporation. Silanox is a hydrophobic fumed silicon dioxide treated with a silane. The heat treated Beta Glass Fiber, acid, Silanox forms a slurry which is subjected to a sonic probe power of 3 amps D.C. for a time period of about 6 minutes. The sonic probe disperses any clumps or bundles of Beta Fiber into individual fibers and helps to open the fibers so that they will become coated with the Silanox within the slurry. The Silanox conditions the Beta Fibers so that they are held apart thus preventing roping or tangling. The operation of Silanox to prevent roping or tangling is not fully understood; however, the theory is believed to be as shown by the drawing. After having subjected the Beta Glass Fiber slurry to the sonic probe power, other glass fibers such as 0.356 grams of A grade (2.1 micron), and 1.168 grams of AAA Grade 0.6 micron, are added to the acid-Silanox solution and mixing by further use of the sonic probe is carried on for from about 5 to about 6 minutes depending on the solids concentration of the slurry. Once the glass fiber-solution has been mixed, it is poured into a hand sheet mold for forming the filter. The valve control for the hand sheet mold is opened to permit the solution to drain through the bottom. The filter is formed on the bottom of the hand sheet mold. The tube of the mold is opened and the filter is removed by use of a roller to which the filter clings as the roller is rolled along over the filter. The filter is then placed on a sheet for final drying. The use and operation of the hand sheet mold for making small filters is well known in the art. The different type of glass fibers mix uniformly and settle on the bottom of the hand sheet mold in such a manner as to form a highly improved filter. Filters formed by the above method have a thickness of 17 to 20 mils; weight of 64.32 sq. ft. per pound with a tensile strength of 1.4 lbs. per inch of width. Such filters, used in a gas mask, filters 99.7% of 0.3 micron particulate matter at a flow rate of 16 liters/minute.

The cleaning, acid-Silanox mixture treatment of the Beta Glass Fibers conditions the Beta Glass Fibers such that the fibers are held apart thus preventing roping or tangling into a mat. The reaction between the Beta Glass Fibers and the Silanox is not understood; however, the treatment is known to enhance dispersion of clumps of Beta Fiber into individual strands resulting in a highly improved filter media.

In carrying out the above method, a typical Glass Filter media contains by weight the following table formulation:

|  | Hand sheet weight 1.625 gr. | Machine Run weight 37.5 gr. |
| --- | --- | --- |
| Glass Fiber A Grade (2.1μ) 21.9% | 0.356 | 8.21 |
| Glass Fiber AAA Grade (0.6μ) 71.9% | 1.168 | 26.96 |
| Glass Yarn ¼" long (3 to 4μ) 3.1% | 0.05 | 1.16 |
| Glass Yarn ½" long (3 to 4μ) 3.1% | 0.05 | 1.16 |

Using terms well known in the art, the concentration of the above glass fibers in 1000 milliliters of water is 4.5 grams of solids comprising the above percentages by weight.

The hand sheet mold may be used for making small sized filters. Filters of much larger size such as for room air filters in hospitals and other clean places which require a high percentage of particulate filtering may be made by other machines such as a Fourdrinier paper machine. A Beta Glass Fiber mat is placed in a pulp beater with the beater plate spaced about ½ inch from the beater so that the beater will not chop or damage the glass fibers. The mat is beat for about 15 minutes so that the glass fibers are spaced and broken down to lengths of from ¼ to ½ in length. About 7 liters of 2.5 to 3.0 pH hydrochloric acid solution containing 0.46 grams of Silanox, is added to the glass fibers and mixed for about 6 minutes. The Silanox solution forms a spiniferous surface that attaches to the restored surface of the glass fibers (see drawing). The restored surface of the glass fiber has a number of reactive Si-O-Si sites tht can form bonds between the silanol groups of the glass. Some Si-O-Si bonds must form between unadsorbed SiOH groups of adjacent adsorbed coupling molecules. The remainder of the glass fibers are added to the slurry acid solution and mixed for from about 10 to 15 minutes. The slurry is then diluted with water and added to the storage tank of the Fourdrinier paper machine. The diluted slurry is then pumped to the head tank from which it is deposited onto the moving drain screen where the glass filter media takes its final sheet form as the liquid mix drains away.

Glass fiber filters made in accordance with each of the methods above without Silanox in the acid solution were not efficient because the Beta Glass Fibers were not uniform due to roping or tangling into a mat. The small amount of Silanox added to the acid solution attaches itself to the Beta Glass Fibers and holds the fibers apart to prevent roping or tangling. It has been determined that the percent by weight of Silanox necessary to prevent tangling and roping is the same for corresponding percent amounts of Beta Glass Fibers used.

Obviously many modifications and variations of the present invention are possible in light of the above teachings. It is therefore understood that within the scope of the appended claims the invention may be practiced otherwise than as specifically described.

What is claimed and desired to be secured by letters patent of the United States is:

1. A method of making Beta fiber reinforced glass filter media which comprises:
heat cleaning a batch of Beta Glass fibers to remove any starch type sizing from the surface thereof;
mixing a small amount of a hydrophobic fumed silicon dioxide treated with a silane with a solution of hydrochloric acid;
adding said surface cleaned Beta Glass fibers to said hydrochloric acid solution containing said hydrophobic fumed silicon dioxide treated with a silane thereby forming a slurry and conditioning said fibers so that they will be held apart thus preventing roping or tangling of said fibers;
subjecting said slurry to a sonic probe for a period of about 6 minutes to disperse any clumps of Beta fibers into individual strands and to open the fibers to that they will become coated with said hydrophobic fumed silicon dioxide treated with a silane;
adding other glass fibers to said slurry;
mixing said added glass fibers with said Beta Glass fibers in said slurry;
pouring said slurry mix into a hand sheet mold;
permitting said solution to drain from said mold leaving behind said glass fiber mixture which forms a glass fiber filter, and then
removing said filter from said mold.

2. A method as claimed in claim 1 in which,
said Beta fibers are cleaned by a heat treatment of from about 325°C to about 375°C for about 16 hours.

3. A method as claimed in claim 2 in which,
said hydrochloric acid concentration is from 2.5 to about 3.0 pH.

4. A method as claimed in claim 3 in which,
said silicon dioxide treated with a silane is mixed with said acid in an amount of about 0.02 gm. for each 2½ liters of acid.

5. A method as claimed in claim 1 in which,
said other glass fibers are mixed with said Beta Glass fibers in said slurry for about 5 to about 6 minutes prior to pouring into said hand sheet mold.

6. A method as claimed in claim 1 in which,
said glass filter media comprises a mix with the following ratio:

|  |  | Hand Sheet weight 1.625 gr. |
|---|---|---|
| Glass Fiber A Grade (2.1$\mu$) | 21.9% | 0.356 |
| Glass Fiber AAA Grade (0.6$\mu$) | 71.9% | 1.168 |
| Beta Glass Fiber ¼" long (3 to 4$\mu$) | 3.1% | 0.05 |
| Beta Glass Fiber ½" long (3 to 4$\mu$) | 3.1% | 0.05. |

7. A method as claimed in claim 1 in which,
said glass filter media comprised a mix with the following ratio:

|  |  | Machine Run weight 37.5 gr. |
|---|---|---|
| Glass Fiber A Grade (2.1$\mu$) | 21.9% | 8.21 |
| Glass Fiber AAA Grade (0.6$\mu$) | 71.9% | 26.96 |
| Beta Glass Fiber ¼" long (3 to 4$\mu$) | 3.1% | 1.16 |
| Beta Glass Fiber ½" long (3 to 4$\mu$) | 3.1% | 1.16. |

* * * * *